April 29, 1947.　　　　C. N. CROSS ET AL　　　　2,419,823
PICTURE FRAME WITH SUPPORT
Filed July 14, 1944　　　2 Sheets-Sheet 1
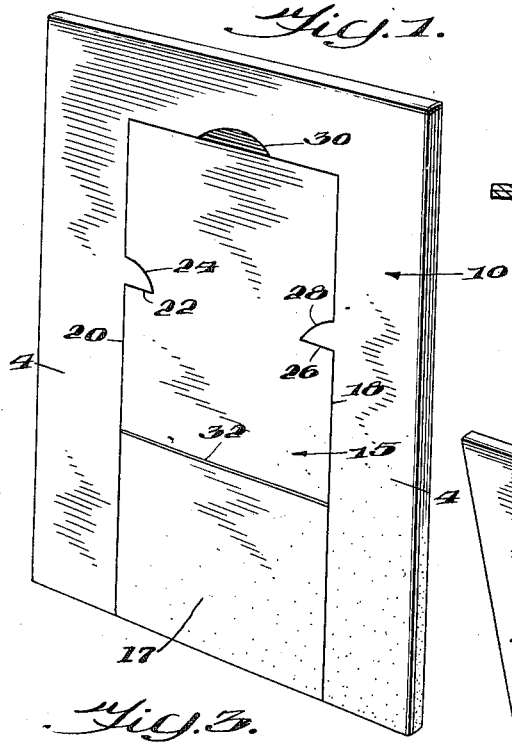
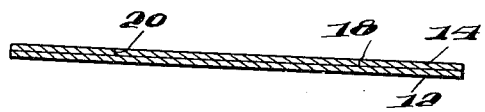
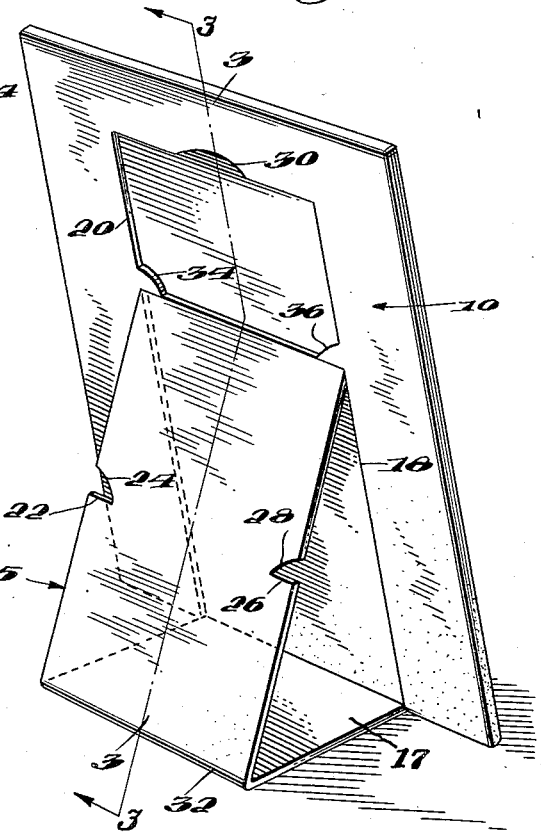
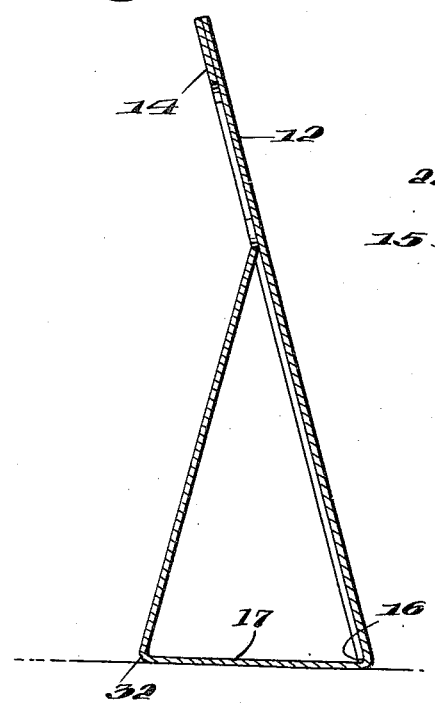
Inventors
CARROLL N. CROSS,
GORDON E. NICHOLS,
Attorney

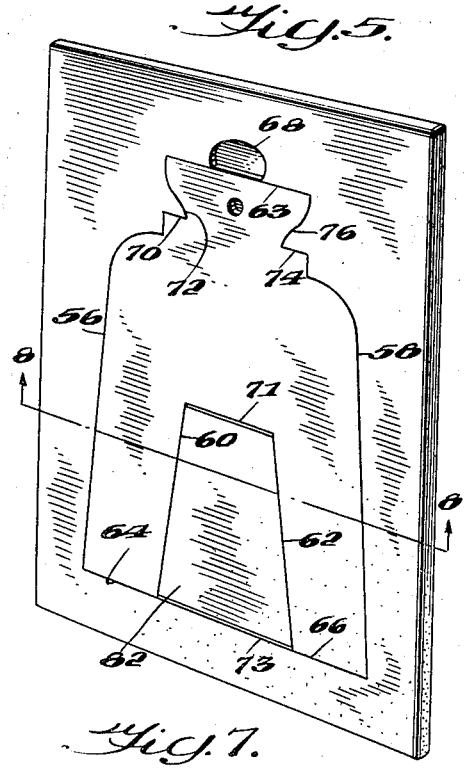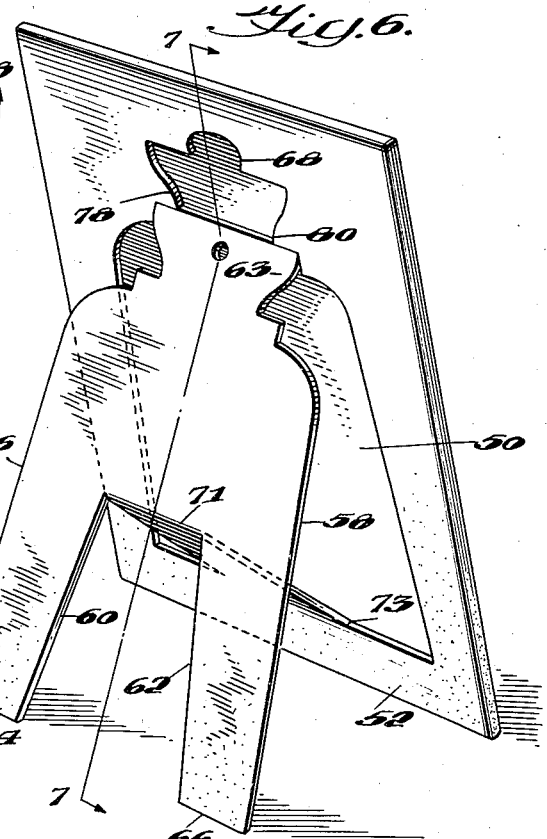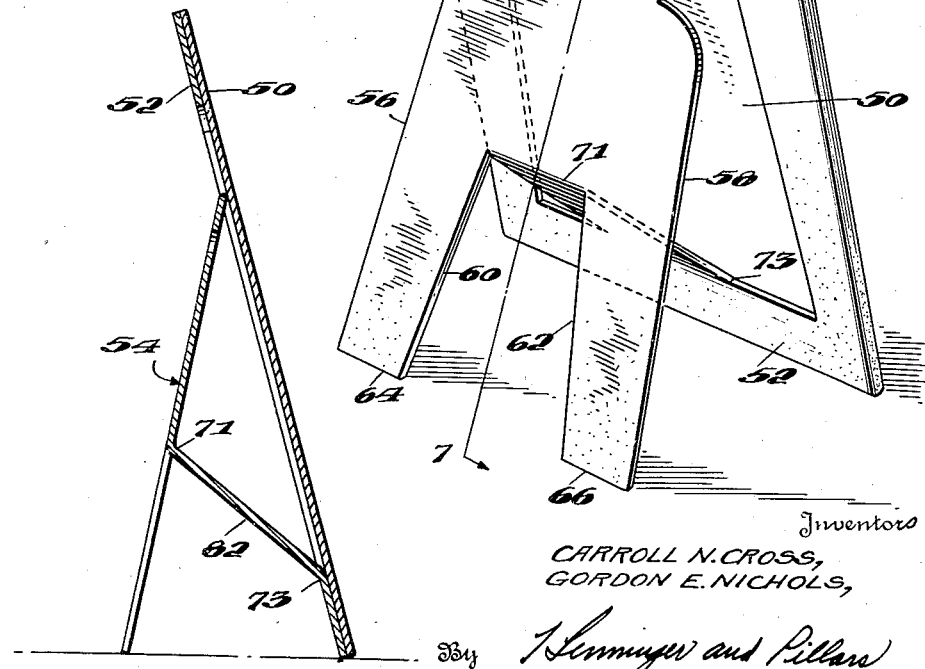

Patented Apr. 29, 1947

2,419,823

UNITED STATES PATENT OFFICE 2,419,823

PICTURE FRAME WITH SUPPORT

Carroll N. Cross and Gordon E. Nichols, Middleboro, Mass.

Application July 14, 1944, Serial No. 544,922

7 Claims. (Cl. 40—152.1)

This invention relates to display mounts and has for one of its objects the provision of novel means for supporting the same in display position.

More specifically, this invention has for another object, the provision of supporting means for a picture mount or the like, the supporting means preferably being formed integrally with at least one element of the mount proper, and providing a positive and substantial support for frames or display mounts of the kind described.

In the conventional construction of display mounts, the mount body is provided with a supporting prop which is usually held in open or mount-supporting position by means of a tongue that has frictional engagement with the prop. These prior constructions failed to provide a positive support for the supporting prop and were consequently subject to occasional failure in operation. It is, therefore, a further object of the invention to provide a positive abutment for the supporting prop in its operative position and thereby eliminate the failure resulting from the prior constructions.

In prior constructions it has been customary to provide mount-supporting legs that have been hinged to the back panel of the mount at a point near the top thereof. These prior constructions were defective in many instances because the supporting legs thereof were unsupported throughout their length and were therefore weakest at their free bottom end. These objections have been overcome herein by providing an easel or supporting leg for mounts with a free upper end and with an integral supporting tongue attaching the easel to the back panel of the mount at a point at or toward the bottom of the easel, an abutment for the free upper end of the easel providing support therefor that renders the easel sturdy throughout its length. Moreover, the construction herein disclosed provides for a mount-supporting leg or easel that is supported by a tongue that is positively joined to both the leg and to the back of the mount, thereby imparting an important strengthening factor to the entire structure.

These and further objects and advantages of this invention will become more apparent from a consideration of the following specification when read in the light of the accompanying drawings in which:

Figure 1 is a perspective view of the rear side of a display mount showing the supporting element in its closed position;

Figure 2 is a perspective view of the rear side of a mount showing the supporting element in its operative position;

Figure 3 is a cross-sectional view of the mount taken on the lines 3—3 of Figure 2;

Figure 4 is a cross-sectional view taken on the lines 4—4 of Figure 1;

Figure 5 is a perspective view of the rear side of a display mount comprising a modification of this invention, and showing the supporting means in its closed position;

Figure 6 is a perspective view of the modification shown in Figure 5, showing the supporting means in operative position;

Figure 7 is a cross-sectional view taken on the lines 7—7 of Figure 6; and

Figure 8 is a cross-sectional view taken on line 8—8 of Figure 5.

Referring now more specifically to Figures 1 to 4, inclusive, of the drawings, the reference numeral 10 indicates, generally, a display mount constructed according to one embodiment of this invention.

The photograph or display mount or frame 10 is constructed of a single strip of relatively flexible or yieldable material such as cardboard as shown in Figure 3, although separate sheets of cardboard may be used. The mount comprises a front member 12 and a rear or back member 14. The front and back members 12 and 14, respectively, are, as shown herein, formed from a single strip of the above-mentioned material which is folded back upon itself along the line 16 which also forms the base edge of the frame 10. The edges of the front and back members may be covered, for example, by a layer of paper for a neater, more decorative effect.

As seen in Figures 2 and 3, a supporting element 15 having a tongue portion 17 is formed by cutting the rear or back member 14 vertically upwardly from the fold line 16 along the lines 18 and 20, terminating at a point adjacent the upper end of the rear member.

Intermediate the ends of the cut lines 18 and 20, two notches are formed in the supporting element 15 by extending the cut lines inwardly and outwardly as indicated by the reference numerals 22, 24, 26, and 28.

The rear or back member 14 is cut away adjacent its free end, as shown at 30, to provide a finger hold in order to facilitate manual manipulation of the supporting element 15, and the supporting element 15 is scored transversely on the line 32. The score line together with line 16 defines the tongue portion 17.

It will now be seen that when it is desired to utilize the mount for display purposes, the free end of the supporting element 15 is rotated outwardly about the base line 16 and then is bent inwardly along the score line 32. The free end is then brought into engagement with the under surfaces of the laterally projecting shoulders 34, 36 which were formed by cutting the back member 14 on the lines 22, 24 and 26, 28.

The adjacent faces of the front and rear members 12 and 14 are held in their respective positions by any desired means such as, for example, by an adhesive decorative flexible lining material or the like.

In the modification shown in Figures 5 to 8, inclusive, the reference numerals 50 and 52 indicate the front and back elements, respectively, whose adjacent surfaces may be held in position in any desired manner as described above.

The supporting member indicated generally by the reference numeral 54 is formed integrally with the back element 52 as illustrated in Figures 6 and 7. The supporting member 54 is constructed by cutting the rear element 52 upwardly along the converging lines 56, 58, and 60, 62, all of which originate at a point adjacent the lower edge of the back element 52. The converging lines 56, 58 terminate at the horizontal line of severence 63, disposed adjacent the top edge of the back element 54. The back member is also cut along the lines 64 and 66, which extend laterally between the cut lines 56, 60 and 58, 62, respectively. The supporting element 54 is then scored on the horizontal lines 71 and 73 to form a tongue portion 82 defined by the cut lines 60, 62 extending between the above-mentioned score lines.

A finger portion is provided by cutting away the material of the back member 52 as shown at 68 in order to facilitate the removal and manipulation of the supporting element 54.

Adjacent the free end of the supporting element 54 the lines of severance 56 and 58 extend inwardly and outwardly as indicated at 70, 72, 74, and 76 to form laterally extending shoulders 78 and 80 integral with the back member 52, as is clearly seen in Figure 6.

When it is desired to display a picture or the like carried by the mount just described, the operator rotates the support member 54 outwardly about the score line 73 and then bends the support member 54 inwardly on the score line 71. The free end of the member 54 is then brought into engagement with the lower surface of the projecting shoulders 78 and 80 to lock the support 54 firmly in position.

While in the embodiment just described the front and back members preferably comprise separate sheets of material, it is obvious that the supporting means and the back member can be formed integrally with the front member in the manner shown in Figures 1 to 5, inclusive.

While modifications may be made of this invention, it is to be understood that the two embodiments shown herein are for the purpose of illustration only, and that the invention shall be limited only by the scope of the following claims.

What we claim is:

1. In a display mount or the like, a back board, a mount-supporting member having a free upper end, a supporting member tongue attached to said back board and attached to said supporting member at a point downwardly remote from the free end of said supporting member, whereby said supporting member and said tongue may be relatively rotated to move the lower end of said supporting member into mount-supporting position, and means engageable by the free upper end of said supporting member to retain said member in mount-supporting position.

2. In a display mount or the like, a back board, a mount-supporting member having a free upper end, a supporting member tongue attached to said back board and attached to said supporting member at a point downwardly remote from the free end of said supporting member, whereby said supporting member and said tongue may be relatively rotated to move the lower end of said supporting member into mount-supporting position, and abutments formed in said back board engageable by the free upper end of said supporting member to retain said member in mount-supporting position.

3. In a display mount or the like, a back board, a mount-supporting member having a free upper end, a supporting member tongue integrally attached to said back board and to said supporting member at a point downwardly remote from the free end of said supporting member, whereby said supporting member and said tongue may be relatively rotated to move the lower end of said supporting member into mount-supporting position, and means engageable by the free upper end of said supporting member to retain said member in mount-supporting position.

4. In a display mount or the like, a back board, a mount-supporting member formed in said back board and having a free upper end, a supporting member tongue integrally attached to said back board and to said supporting member at a point downwardly remote from the free end of said supporting member, whereby said supporting member and said tongue may be relatively rotated to move the lower end of said supporting member into mount-supporting position, and abutments in said back board engageable by the free upper end of said supporting member to retain said member in mount-supporting position.

5. In a display mount or the like, a front member, a back member superimposed on and covering the rear surface of said front member, a mount supporting element formed in said back member and adapted to lie wholly within the plane thereof when in inoperative position, said supporting element comprising a mount supporting portion adapted to be moved into mount supporting position and a free end portion, a tongue hinged at one end to said mount and at the other end thereof to said supporting element at a point remote from the free end portion of said element whereby the free end of said supporting element may be moved longitudinally with respect to said back member during movement into mount supporting position, and an abutment formed in and lying in the plane of said back member for engaging the free end of said supporting element when said element is moved to mount supporting position.

6. In a display mount or the like, a front member, a back member superimposed on and covering the rear surface of said front member, a mount supporting element formed in said back member and adapted to lie wholly within the plane thereof when in inoperative position, said supporting element having a mount supporting end adapted to be moved into mount supporting position and a free end portion, a tongue having one end hinged to said mount at the bottom edge thereof and its other end hinged to said supporting element at the mount supporting end of said element whereby the free end of said supporting element may be moved longitudinally with respect to said back member during movement into mount supporting position, and an abutment formed in and lying in the plane of said back member for engaging the free end of said supporting element when said element is moved to mount supporting position.

7. In a display mount or the like, a front member, a back member superimposed on and covering the rear surface of said front member, an inverted U-shaped mount supporting element formed in said back member and adapted to lie wholly within the plane thereof when in inoperative position, said supporting element providing a pair of mount supporting legs adapted to be moved into mount supporting position and a free end portion, a tongue hinged at one end to said mount and at the other end thereof to said supporting element at a point substantially midway of its length whereby the free end of said supporting element may be moved longitudinally with respect to said back member during movement into mount supporting position, and an abutment formed in and lying in the plane of said back member for engaging the free end of said supporting element when said element is moved to mount supporting position.

CARROLL N. CROSS.
GORDON E. NICHOLS.

REFERENCES CITED

The following references are of record in the file of this patent:

UNITED STATES PATENTS

| Number | Name | Date |
|---|---|---|
| 246,081 | Caterson | Aug. 23, 1881 |
| 527,694 | Jones | Oct. 16, 1894 |
| 1,416,103 | Roy | July 13, 1915 |
| 1,486,652 | Froehlich | Mar. 11, 1924 |
| 547,377 | Gillbee | Oct. 1, 1895 |
| 1,379,612 | Baner | May 31, 1921 |
| 2,172,273 | Chilcote | Sept. 5, 1939 |
| 2,245,363 | Price | June 10, 1941 |

OTHER REFERENCES

Ex parte Quayle, 453 O. G. 213; C. D. 1935—11.